Jan. 6, 1959 R. W. JENSEN 2,867,194
PNEUMATIC REMOTE POSITION ACTUATOR
Filed Sept. 2, 1955 2 Sheets-Sheet 2

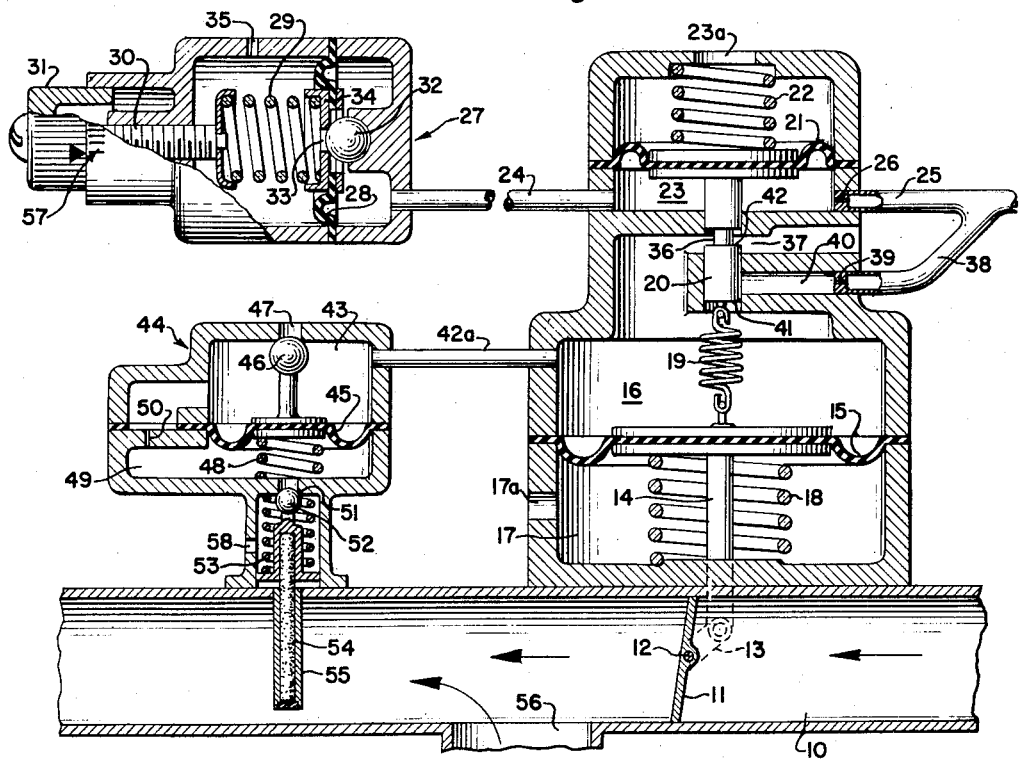

RAYMOND W. JENSEN,
INVENTOR.

BY John H. Wallace

United States Patent Office 2,867,194
Patented Jan. 6, 1959

2,867,194

PNEUMATIC REMOTE POSITION ACTUATOR

Raymond W. Jensen, Phoenix, Ariz., assignor to The Garrett Corporation, Los Angeles, Calif., a corporation of California Application September 2, 1955, Serial No. 532,206

9 Claims. (Cl. 121—41)

This invention relates to a pneumatic remote position actuator and more particularly to a pneumatic actuator which may be remotely controlled precisely, to position and maintain a device actuated thereby, in position regardless of load changes imposed on the actuator by the device.

Pneumatic actuators are generally applicable to a variety of aircraft installations wherein a source of high pressure air is readily available. Furthermore, pneumatic actuators may provide very rapid response to a control condition and are compatible with a great variety of environmental conditions found in aircraft.

It has been difficult to control a pneumatic actuator remotely in order accurately to locate it in a desired position, and to maintain it precisely in such a position under varying loads imposed by a device being actuated or positioned. In addition, it is desirable for such a pneumatic actuator to be double acting under the foregoing conditions.

It is an object of the invention to provide a pneumatic actuator which is remotely controlled and which will precisely locate and maintain itself in a certain position regardless of loads imposed by a device operated thereby.

Another object of the invention is to provide a pneumatic remote position actuator which is particularly adapted to aircraft installations wherein pneumatic forces are employed to actuate heavily loaded devices requiring rapid and accurate positioning, and wherein very sensitive feedback means is required to prevent hunting of the actuator, and to maintain the actuated device in a certain position.

Another object of the invention is to provide a novel, pneumatic, remote-position actuator having a very compact arrangement of a linear actuator and associated feedback mechanism.

Another object of the invention is to provide a double acting, pneumatic, remote-position actuator having a novel mechanical locking device for holding the actuator in a desired position regardless of varying loads thereon and which will lock the actuator in its existing position in the event pneumatic forces acting thereon fail.

A further object of the invention is to provide a pneumatic, remote-position actuator which employs simple and compact means for remotely controlling the actuator accurately to locate and position it to maintain it in a desired position.

A still further object of the invention is to provide a very simple, pneumatic, remote-position actuator which may be remotely controlled by a variety of devices to operate a pneumatic bleed-off valve.

Other objects and advantages of the invention will be apparent from the following specification, appended claims, and accompanying drawings in which:

Figure 1 is a partial view of a pneumatic remote position actuator according to the present invention;

Fig. 2 is a sectional view of a modified pneumatic remote position actuator in accordance with the present invention and showing parts and portions thereof in elevation;

Figure 3:
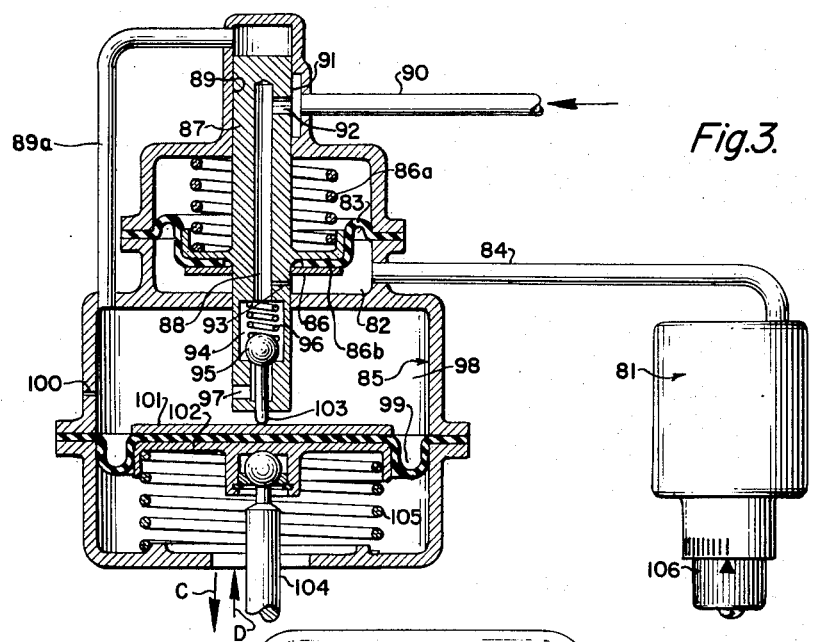
Fig. 3 is a sectional view of another modified pneumatic remote position actuator in accordance with the present invention and illustrating parts and portions in elevation.

The invention relates generally to a pneumatic remote position actuator which is capable of operating heavily loaded devices requiring very rapid positioning and which must be maintained in a desired position. In addition, the invention comprises a novel remote control device and feedback mechanism which prevents hunting of the actuator during positioning and when there are imposed upon it varying loads from the device which it actuates.

Pneumatic remote positioning actuators are particularly adapted to aircraft since they may be operated by compressed air at high pressure bled from the compressor of the aircraft engine. In general, the present pneumatic remote position actuator is controlled by a pressure regulator which may be manually adjusted or which may be adjusted by any suitable device which is responsive to changing conditions.

As shown in Fig. 1 of the drawings, the invention is arranged to control thermostatically flow of a relatively hot fluid through a conduit 10 by means of a butterfly valve 11 which is carried by a pivoted shaft 12. The shaft 12 is actuated by a bellcrank 13 which is pivotally connected to an actuator rod 14. The actuator rod 14 is connected to a diaphragm 15 having one side exposed to a pressure chamber 16 and the other side subjected to the pressure in a chamber 17. An opening 17a allows unrestricted entry of ambient air into the chamber 17 so that the pressure of the air in that chamber is, at all times, the same as the pressure of the ambient air. A spring 18 tends to force the diaphragm 15 toward the pressure chamber 16 and to urge the valve 11 toward closed position. Connected to the diaphragm 15 is a spring 19 which is also connected to a feedback valve member 20 which operates to regulate pressure in the chamber 16, as will be hereinafter described in detail. The feedback valve 20 is connected at its upper end to a diaphragm 21 which is biased by a spring 22 in opposition to the pressure in a chamber 23 communicating with conduits 24 and 25. An opening 23a permits the opposite side of the diaphragm 21 to be subjected at all times to the pressure of the ambient air.

The conduit 25 is a pressure supply conduit, leading from a source of high pressure (not shown), and having a restricted orifice 26 which serves as an inlet for the chamber 23. The orifice 26 serves as a flow restriction having a relatively lesser flow capacity than that of a pressure regulator 27 which may be adjusted to vary pressure relief from the chamber 23 and to control pressure exerted on the diaphragm 21. The pressure regulator 27 is provided with a pressure responsive diaphragm 28 which communicates with the conduit 24. Fluid pressure conducted by the conduit 24 acts on the diaphragm in opposition to a spring 29, the tension of which is adjustable by a screw 30 having a manual control knob 31 fixed thereto. Communicating with the conduit 24 and the pressure receiving side of the diaphragm 28 is a ball valve element 32 which co-operates with an opening 33 in a plate 34 fixed to the diaphragm 28. In operation, a pressure on the diaphragm 28 capable of forcing the spring 29 to yield moves the opening 33 away from the ball 32 and permits fluid in chamber 23 to escape to ambient atmosphere through the conduit 24, opening 33, and a vent 35 in the pressure regulator housing. Thus, the pressure regulator 27 functions to maintain a preselected pressure in the chamber 23 which acts upon the diaphragm 21 and compresses the spring 22 correspondingly.

The feedback valve 20, connected to the diaphragm 21, is a cylindrical structure having an annular groove 36 which controls flow from chamber 16 through a vent passage 37 communicating with ambient atmosphere. Communicating with the pressure supply conduit 25 is a branch conduit 38 having a restricted flow orifice 39 which communicates with a pressure supply passage 40. This passage is arranged to supply working pressure to the chamber 16 when the end 41 of the feedback valve 20 is moved upward by the diaphragm 21 to a position in which the passage 40 is permitted to communicate with chamber 16. One end 42 of the groove 36 in the valve 20, is arranged to restrict the passage 37 concurrently with the further opening of the passage 40 by the end 41 of the valve 20.

Communicating with the chamber 16 is a tube 42a which also communicates with a pressure chamber 43 of a thermostatic valve 44. Positioned in the housing of the valve 44 is a diaphragm 45 which is responsive on one side to the pressure in the chamber 43. Fixed to the diaphragm 45 is a ball valve element 46 which seats in a vent opening 47 extending through the housing wall of the chamber 43. This vent opening 47 communicates with ambient atmosphere and relieves pressure from the chamber 43 when the magnitude of the pressure acting on the diaphragm 45 is sufficient to compress a spring 48 which tends to oppose the pressure in the chamber 43 and to maintain the ball valve 46 seated in the vent opening 47. The housing of the thermostatic valve 44 is provided with a second chamber 49 communicating with the diaphragm 45 at the opposite side thereof from the chamber 43. A restricted orifice 50 intercommunicates with the chambers 43 and 49. The chamber 49 is provided with a vent opening 51 in which a ball valve element 52 is seated normally to control relief of pressure from the chamber 49 to a vent 58 which communicates with ambient atmosphere. A spring 53 co-operates with telescopically assembled temperature responsive elements 54 and 55 to move the ball valve element 52 in a direction to open the vent 51 when a predetermined temperature is reached. The temperature responsive elements 54 and 55 have different coefficients of expansion and tend, under changes in temperature, to provide for linear actuation of the ball valve element 52. The temperature responsive element 55 is formed of material having a greater coefficient of expansion that that of the element 54 and is fixed at its upper end and free at its lower end, so that an increase in temperature will permit the spring 53 to force the element 54 down into the element 55 and move the ball valve element 52 into open position relative to the vent opening 51. Communicating with the conduit 10 intermediate the valve 11 and the temperature responsive element 55 is a conduit 56 which supplies a relatively cooler fluid to form a mixture with the hot fluid flowing past the valve 11. The temperature of the mixture is sensed by the temperature responsive element 55 in order to control modulating operation of the valve 11, as will be hereinafter described in detail.

Operation of the remote position actuator shown in Fig. 1 of the drawings is substantially as follows.

The pressure regulator 27, being remotely connected to the operating mechanism of the actuator, may be manually set to effect a desired position of the valve 11 in the conduit 10. The manual control knob 31 may be adjusted in accordance with calibrations 57 in order to establish a definite initial compression of the spring 29. Thus, the pressure regulator 27 is adjusted to permit pressure above a predetermined magnitude to be relieved from the pressure chamber 23 to ambient atmosphere via the conduit 24, opening 33 and vent 35. When a given pressure, as determined by the pressure regulator 27, exists in the chamber 23, such pressure acts on the diaphragm 21 to compress the spring 22. Upward movement of the diaphragm 21 positions the feedback valve 20 so that pressure in the passage 40 is permitted to communicate with the chamber 16. The valve 20 concurrently restricts escape of pressure from the chamber 16 through the passage 37. In this manner, the feedback valve 20 and diaphragmn 21, biased by the spring 22, act as a pressure regulator for the chamber 16. When pressure is increased in the chamber 16 by reason of a pressure increase in the chamber 23, the diaphragm 15 moves toward the conduit 10 and urges the valve 11 toward the open position. When pressure in the chamber 16 moves the diaphragm 15 against compression of the spring 18, tension in the spring 19 is increased. This tension serves as a feedback force which is exerted on the feedback valve 20 acting against the pressure in the chamber 23. Thus the diaphragm 15, as it nears the desired position called for by the setting of pressure regulator 27, is gradually subjected to slightly reduced pressure by the pull of spring 19 whereby it reaches a predetermined position without overshooting or hunting.

When the temperature sensed by the temperature responsive element 55 reaches a predetermined value, expansion of the temperature responsive element 55 exceeds that of the element 54, thereby permitting the spring 53 to move the ball valve element 52 away from its seat in the vent 51, whereupon pressure in the chamber 49 is vented to atmosphere via a vent opening 58. As pressure in the chamber 49 is thus reduced, the pressure differential across the diaphragm 45 is changed, whereupon the diaphragm moves the ball valve element 46 away from its seat and permits pressure to escape from the chamber 43 to ambient atmosphere through the vent opening 47. By this means, pressure in the chamber 16 is reduced, which permits the spring 18 to move the diaphragm 15 in a direction toward the chamber 16, and the valve 11 toward closed position.

The thermostatic valve 44 operating independently of the pressure regulator 27 may reduce the flow of high temperature fluid through the conduit 10, thereby reducing temperature of a mixture of fluids from the conduits 10 and 56. The thermostatic valve 44, therefore, serves as a maximum temperature limiter. It will be understood that the pressure regulator 27, as shown in Fig. 1 of the drawings, serves remotely to position the valve 11 to permit a certain flow condition through the conduit 10. The thermostatic valve 44 co-operates with the pressure regulator 27 and actuating diaphragm 15 to provide modulating control in accordance with temperature changes occurring in the fluid flowing through the conduit 10.

It will be understood that when the valve 11 is in partially open position flow changes through the conduit 10 may cause an aerodynamic force to act on the valve about the axis of the shaft 12, thereby creating load changes on the diaphragm 15. Such a load change tending to move the diaphragm 15 toward the conduit 10 will cause the feedback valve 20, by means of the spring 19, to move slightly toward the diaphragm 15 and reduce pressure in the chamber 16, permitting increased vent flow through the passage 37 and reducing pressure supply through the passage 40. When the pressure is thus reduced in the chamber 16, the spring 18 overcomes the opposing force on the diaphragm 15 and tends to overcome the torque created by the aforesaid aerodynamic force on the valve 11.

In the event changing aerodynamic forces on the valve 11 tend to force the diaphragm 15 toward the feedback valve 20, tension in the spring 19 is reduced which permits pressure in the chamber 23 to move the feedback valve 20 toward the spring 22, whereupon vent flow from the chamber 16 through the passage 37 is reduced and the pressure supply to the chamber 16 from the passage 40 is increased. Thus, pressure in the chamber 16 acting on the diaphragm 15 is correspondingly increased in order to overcome torque exerted on the shaft 12 by aerodynamic forces which tend to move the diaphragm 15 toward the chamber 16.

It will be understood that the various diaphragms disclosed in the drawings of the present invention may be termed movable walls since equivalent devices, for example, pistons or bellows, may be substituted therefor as desired.

In the modification of the present invention, as shown in Fig. 2 of the drawings, a pressure regulator 60 is remotely connected to its related actuating mechanism by means of a tube 61. The pressure regulator 60 is similar in construction to the pressure regulator 27 shown in Fig. 1 of the drawings and communicates through the tube 61 with a pressure chamber 62 and a diaphragm 63 therein. Fixed to the diaphragm 63 are clamp plates 64 and 65 which engage a feedback valve 66 and a cooperating spring 67, respectively. A light spring 59 tends to maintain the feedback valve 66 in engagement with the plate 64. The feedback valve 66 is a cylindrical valve member reciprocally mounted in a bore 68 in a housing 69 which also forms part of the enclosure for the chamber 62. The feedback valve 66 is provided with an annular groove 70 which serves as a regulating valve element to control pressure delivered from a source of high pressure (not shown) through a pressure supply tube 71 to a tube 72 which communicates with a pressure chamber 73 and a diaphragm 74.

Intercommunicating with the pressure supply tube 71 and the pressure regulator tube 61 is an orifice 79, the flow capacity of which is less than the venting capacity of the pressure regulator 60 in order to permit the pressure regulator 60 to control pressure in the chamber 62.

Connected to the diaphragm 74 is a rod 75 which may be coupled to a device to be actuated. Communicating with the chamber 73 is a pressure relief orifice 76 serving as a vent intercommunicating with pressure in the chamber 73 and ambient atmosphere. A spring 77 exerts force on the diaphragm 74 tending to oppose pressure in the chamber 73 and also serves to actuate the rod 75 in one direction.

The housing is provided with a breather vent opening 74a which permits ambient atmosphere, at all times, to communicate with the diaphragm 74 which forms one wall of the chamber 73.

The operation of the modified pneumatic remote position actuator of the present invention, as shown in Fig. 2 of the drawings, is substantially as follows.

When the device connected to the rod 75 is to be moved to and maintained in a given position, the pressure regulator 60 is adjusted to a setting on the calibrations 80 which correspond to such position. The pressure regulator 60 then maintains a predetermined pressure in the chamber 62, and the pressure is impressed on the diaphragm 63. Pressure in the chamber 62 when acting on the diaphragm 63 causes corresponding deflection of the spring 67 and permits the light spring 59 to move the feedback valve member 66 in a direction permitting the annular groove 70 to allow an increase of pressure in the chamber 73. When pressure in the chamber 73 increases, the diaphragm 74 and rod 75 move toward the feedback valve 66, causing compression of the spring 77 corresponding to pressure in the chamber 73. As the diaphragm 74 moves toward the feedback valve 66, compression of the spring 67 gradually increases and thereby transmits a feedback force to the feedback valve 66. This force gradually increases and opposes control pressure acting on the diaphragm 63 and thereby causes the feedback valve 66 gradually to reduce the increase in pressure in the chamber 73. Pressure in the chamber 73 is then prevented from increasing too rapidly and causing the diaphragm 74 to overtravel or hunt about a desired position as determined by the setting of the pressure regulator 60.

In the event the device being actuated by the rod 75 imposes a load in the direction of the arrow A, the spring 67 is slightly compressed, whereupon the diaphragm 63 is moved against pressure in the chamber 62 causing corresponding movement of the feedback valve 66 which thereupon tends to restrict flow through the tubes 71 and 72, causing a reduction of pressure in the chamber 73. This reduction takes place due to the fact that there is a constant relief of pressure from the chamber 73 via the orifice 76. As pressure is reduced in the chamber 73, the force of the spring 77 then reacts against the load imposed by the actuated device in a direction as indicated by the arrow A.

In the event the actuated device connected to the rod 75 exerts a force thereon, in the direction of the arrow B, the diaphragm 74 is slightly moved away from the diaphragm 63, whereby compressive force of the spring 67 is reduced which permits pressure in the chamber 62 to force the diaphragm 63 toward the diaphragm 74. Action of the diaphragm 63 in this direction causes the feedback valve 66 to permit an increased pressure to be conducted, via tubes 71 and 72, to the chamber 73. Increased pressure in the chamber 73 then acts on the diaphragm 74 to resist a load change imposed by the actuated device on the rod 75 in the direction of the arrow B.

From the foregoing, it will be understood that the pressure regulator 60 is employed to predetermine and control the positioning of an actuated device connected to the rod 75. The feedback valve 66 and the spring 67 co-operate with the pressure regulator 60 to maintain the actuated device in a predetermined position, regardless of loads exerted on the rod 75 by the actuated device.

In the modified pneumatic remote position actuator of the present invention, as shown in Fig. 3 of the drawings, a pressure regulator 81 may be remotely positioned with respect to the actuating mechanism of the invention. The pressure regulator 81 is similar in construction to that of the pressure regulator 27, as shown in Fig. 1 of the drawings. The pressure regulator 81 communicates with a chamber 82 and a diaphragm 83 by means of a tube 84. A housing 85 serves as one wall of the chamber 82, while the diaphragm 83 constitutes a movable wall thereof. Fixed to the diaphragm 83 by means of clamp plates 86 and 86b is a shaft 87 having a bore 88 therein. The plate 86b is engaged by a spring 86a tending to exert force on the diaphragm 83 in opposition to pressure in the chamber 82.

The shaft 87 is slidably mounted in a bore 89 of the housing 85 and communicating with the bore 89 is a pressure supply tube 90 leading from a source of high pressure (not shown). A conduit 89a, as shown, permits the same fluid pressure exerted on the bottom end of the shaft 87 to be manifest upon the top end of the shaft, for pressure balancing. An elongated slot 91 intercommunicates with the bore 89 and the tube 90 in order to provide communication of the tube 90 with an opening 92 in the shaft 87 when it moves axially in the bore 89. The opening 92 in the shaft 87 communicates with the bore 88 thereof. An orifice 93 intercommunicates with the bore 88 and the chamber 82. Carried in an enlarged portion 94 of the bore 88 is a feedback valve 95. A spring 96 tends to maintain the feedback valve 95 in closed position, to prevent flow past the feedback valve and through an opening 97 which communicates with a chamber 98 at one side of the diaphragm 99. The housing 85 is provided with a vent orifice 100 which communicates with the chamber 98. The diaphragm 99 is clamped between plates 101 and 102 connected to a rod 104, the plate 101 serving to actuate a stem 103 of the feedback valve 95. A spring 105 engages the plate 102 and exerts a force tending to oppose pressure in the chamber 98. The rod 104 may be connected to any device to be actuated, as desired.

The operation of the modified form of the invention, as shown in Fig. 3 of the drawings, is substantially as follows:

When a device to be actuated and positioned is connected with the rod 104, the pressure regulator 81 by means of its manual control knob 106 is adjusted to correspond to a desired position of the rod 104 and a device to be actuated thereby. When the pressure regulator 81 is set to regulate pressure in the chamber 82, such pressure acts on the diaphragm 83 in opposition to the force of the spring 86a, thereby slightly compressing the spring to a certain position. The spring 105 tends to force the diaphragm 99 toward the shaft 87 and the vent 100 permits pressure to be relieved from the chamber 98 to atmosphere. As the diaphragm 99 thus tends to follow the shaft 87, it contacts the stem 103 of the feedback valve 95 and gradually opens the valve, permitting pressure to pass through the tube 90, bore 88, and opening 97 into the chamber 98, whereupon pressure builds up in the chamber 98 and gradually checks movement of the diaphragm motivated by the force of the spring 105. The feedback valve element 95 co-operates directly with the diaphragm 99 and with a valve element seat in the enlarged bore 94 which is controlled by the diaphragm 83. It will be noted that direct actuation of the feedback valve element 95 by the diaphragm 99 provides a very simple arrangement without resilient linkage between the main actuator diaphragm 99 and the power feedback valve element 95. The orifice 93 serves as a restricted supply passage for control pressure to the chamber 82, and pressure regulator 81 and is in communication with the chamber 82 at all times.

In the event a load change occurs on a device actuated in connection with the rod 104 and tends to force it in a direction as indicated by the arrow C, the diaphragm 99 may be moved away from the shaft 87. The spring 96 is then permitted to move the feedback valve element 95 toward the closed position, whereupon a continuous relief of pressure through the orifice 100 reduces pressure in the chamber 98 and permits the spring 105 to force the diaphragm in a direction opposite to the arrow C, thereby tending to maintain the rod 104 and the device being actuated in the desired position.

In the event the actuated device exerts a force on the rod 104 in a direction of the arrow D, the feedback valve element 95, due to slight deflection of the diaphragm 99, will be moved toward an open position in which it permits an increase of pressure in the chamber 98 which acts on the diaphragm 99 to oppose the force brought to bear upon the rod 104 in a direction of the arrow D.

Figure 4:
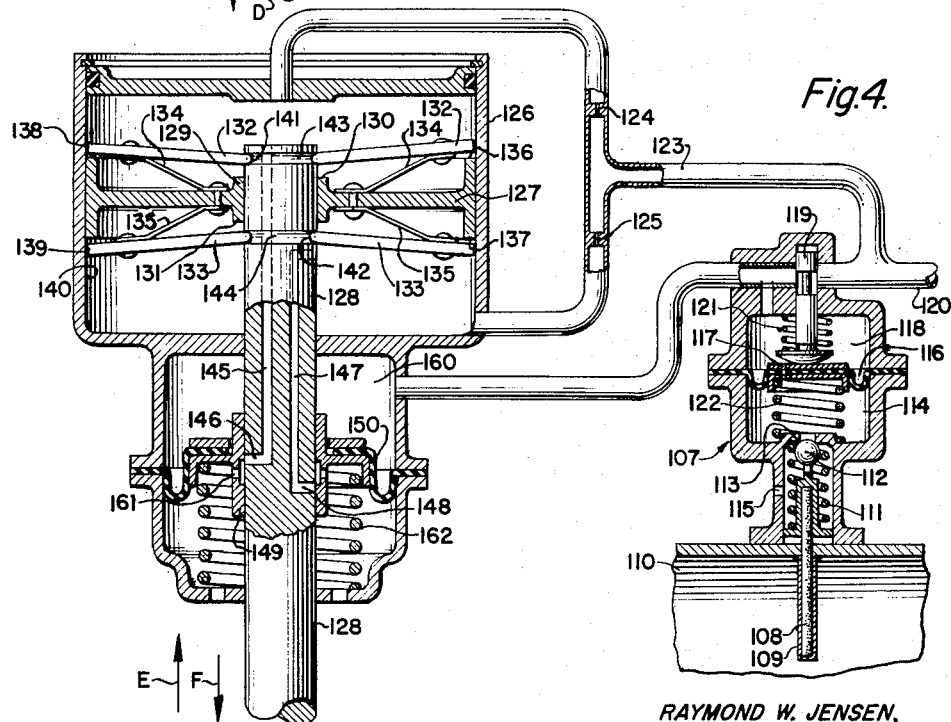
Fig. 4 is a sectional view of a further modified remote position actuator in accordance with the present invention and showing parts and portions in elevation.

In the modified remote positioning actuator of the present invention, as shown in Fig. 4 of the drawings, a thermostatic pressure regulator 107 serves as a remote position controller for the positioning and actuating mechanism co-operating therewith. The pressure regulator 107 is provided with temperature sensitive elements 108 and 109 which may be disposed in a conduit 110 to sense a change in the temperature of fluid passing therethrough. The coefficient of expansion of the element 109 is greater than that of the element 108. The element 109 responds to an increase in temperature which will permit a spring 111 to open a ball valve element 112 with respect to a vent seat 113. When the valve element 112 is open, pressure in the chamber 114 is vented to atmosphere via a vent 115. The diaphragm 116 forms a movable wall of the chamber 114 and is provided with an orifice 117 which communicates with chambers 114 and 118 on opposite sides of the diaphragm 116. Engaged by the diaphragm 116 is a pressure regulating valve 119 which communicates with a pressure supply tube 120 and the chamber 118. A spring 121 tends to maintain the pressure regulating valve 119 in engagement with the diaphragm 116. A spring 122 engages the diaphragm 116 and tends to oppose pressure in the chamber 118 which acts on the diaphragm 16.

Communicating with the pressure supply tube 120 is a tube 123 leading to orifices 124 and 125 which communicate with opposite ends of the actuating cylinder 126 in which a piston 127 is reciprocably positioned. The shaft 128 extends into the cylinder 126 and supports the piston 127 which is axially slidable thereon. The piston 127 is provided with a hub portion 129 serving as a slide bearing on the shaft 128. Opposite ends 130 and 131 of the piston hub portion are engageable with piston locking fingers 132 and 133, respectively. These locking fingers 132 and 133 are secured to the piston by resilient members 134 and 135, respectively. The piston 127 is provided with a peripheral body portion having a greater axial length than that of the hub portion 129, whereby opposite ends 136 and 137 of the piston are normally closer to the locking fingers 132 and 133 than are the opposite ends 130 and 131, respectively, of the piston hub. The outer ends 138 and 139 of the locking fingers 132 and 133, respectively, are normally held in engagement with the cylinder bore 140 by the resilient members 134 and 135 whereby they are frictionally locked in a certain position in the actuator cylinder 126. The locking fingers 132 and 133 at their inner ends 141 and 142, respectively, engage annular grooves 143 and 144, respectively. The thrust of the piston 127 is transmitted to the shaft 128 by the hub portion 129, the ends 130 and 131 thereof, after limited travel, engaging the inner ends of the fingers, which serve as abutments or stops.

The shaft 128 is provided with a passage 145 which communicates with the side of the piston 127 adjacent to the fingers 132 and extends to the outside of the shaft 128 by means of a port 146. The shaft 128 is also provided with another passage 147 communicating with the other side of the piston 127, adjacent the locking fingers 133. This passage is provided with a port 148 which communicates with the outside of the shaft 128 which is surrounded by a feedback valve element 149 connected to a diaphragm 150. The diaphragm 150 is responsive on one side to pressure in a chamber 160 communicating with the pressure regulating valve 119. The ports 146 and 148 are spaced axially of the shaft 128 while the valve element 149 is provided with an annular series of interconnected radial vent passages 161 which are adapted to further open one of the ports 146 or 148 while concurrently restricting the other one of them. The spring 162 exerts force on the diaphragm 150 tending to slide the valve element 149 axially of the shaft 128 while pressure in the chamber 160 opposes the spring 162.

The operation of the modification of the invention shown in Fig. 4 of the drawings is substantially as follows.

The shaft 128 is connected to a device requiring actuation and positioning, and the thermostatic valve 107 controls the operation of the pressure regulating valve 119 in accordance with temperature sensed by the temperature sensing element 109. Actuation and positioning of the shaft 128 are controlled in direct proportion to the degree of temperature change sensed by the thermostatic element 109. When the temperature increases in the conduit 110, the element 109 expands to a greater extent than does the element 108 permitting the spring 111 to force the ball valve element 112 from its seat, whereby the chamber 114 is vented to atmosphere via the vent openings 113 and 115. When the chamber 114 is thus vented, pressure in the chamber 118 acts to compress the spring 122 and move the pressure regulating valve 119 to restrict flow of high pressure air from the tube 120 to the chambers 118 and 160. The pressure regulating valve 119 serves as a feedback valve since the spring 121 forces it to follow the diaphragm 116 concurrently reducing pressure in the chambers 118 and 160. When the diaphragm 116 is moving toward the chamber 114 and the pressure regulating valve 119 is progressively reducing pressure fed to the chamber 118, the diaphragm 116 reaches a position at which it stabilizes without undue overtraveling or hunting. Thus, pressure in the chamber 160 acting on the diaphragm 150 is very quickly established in direct proportion to a temperature increase sensed by the temperature responsive element 109. It will be noted that a temperature increase sensed by the temperature sensing element 109 will cause a decrease in pressure in the chamber 160, while a reduction in temperature sensed by the element 109 will cause an increase in pressure in the chamber 160. It will be understood that pressure downstream of the pressure regulating valve 119 and in the chamber 160 will be reduced due to a restricting operation of the pressure regulated valve 119 and due to a relief of pressure through the orifice 117 and vent openings 113 and 115, when the ball valve element 112 has been opened to increase flow through the vent passage 113. Conversely, if a decrease in temperature is sensed by the element 109, it contracts and forces the ball valve element 112 to restrict the vent passage 113, thereby slowly permitting pressure to build up in the chamber 114. When this pressure increases relative to that in the chamber 118, the spring 122 acts to open the pressure regulating valve 119 for increasing flow to the chambers 118 and 160.

When pressure increases in the chamber 160, it acts on the diaphragm 150 and compresses the spring 162 thereby moving the feedback valve element 149 toward a position in which it restricts flow from the port 146 and increases flow through the port 148. The feedback valve thus causes a pressure rise on the face of piston 127 adjacent to the locking fingers 132 and a pressure decrease on the face of the piston 127 adjacent the locking fingers 133. This pressure differential causes the piston 127, at the end 137 of its body portion, to engage the locking fingers 133 at their outer ends and release them from the cylinder wall 140. The piston 127 at its hub portion 130 then engages the fingers 133 adjacent the annular groove 144 and carries the piston rod 128 in a direction toward the feedback valve element 149. When the piston 127 moves toward the feedback valve element 149, the locking fingers 132 are merely dragged behind the piston 127 to a new position. During movement of the piston rod 128 toward the feedback valve element 149, the ports 146 and 148 move relative to the vents 161 and cause a gradual reversal of the pressure differential acting to move the piston 127 toward the feedback valve element 149.

When pressure is decreased in the chamber 160 the opposite action of the feedback valve element 149, piston 127, locking fingers 132 and 133, and the shaft 128 takes place.

When a balance of forces exists in the cylinder 126 at opposite ends of the piston 127, the springs 134 and 135 cause the locking fingers 132 and 133 to lock the rod 128 axially of the cylinder 126. The rod 128 is thus prevented from being moved by force exerted by the device actuated by it. It will be understood that the feedback valve element 149 co-operating with the ports 146 and 148 provides for a flow capacity which is proportioned relative to that of the orifices 124 and 125 so that pressure in the cylinder 126 may be quickly increased or reduced at either end of the piston 127. The feedback valve element 149 responds to pressure in the chamber 160, which is directly proportional to the magnitude of a temperature change which is sensed by the temperature responsive element 109.

In addition to the locking function of the fingers 132 and 133, it will be recognized that the feedback valve element 149 will automatically compensate for loads which may be imposed axially on the shaft 128 by a device actuated in connection therewith. In the event the fingers 132 and 133 become inoperative and slip in the bore of the cylinder 126, the feedback valve element 149 will compensate therefor. If a load is applied to the shaft 128, in a direction as indicated by the arrow E, and should the shaft 128 respond to the force and move in that direction, the port 146 in moving relation to the annular vent 161 causes restriction of relief flow from the passage 145; and, consequently, pressure is increased on the end of the piston 127 adjacent the fingers 132 which opposes the force applied on the rod 128. If a force is applied to the shaft 128 in the direction of the arrow F, the opposite effect will be accomplished by the feedback valve element 149. A pressure differential axially of the piston 127 is quickly changed by movement of the ports 146 and 148 relative to the feedback valve element 149. The pressure differential is quickly created due to the fact that while one of the ports may be progressively restricted, the other may be opened, or vice-versa, depending upon the direction of force applied to the shaft 128 or the direction of movement of the feedback valve element 149.

It will be noted that a remote pressure regulator employed in the present invention may be a pressure relief type such as the regulator 27 or it may be a pressure supply type such as the regulator 107.

The structure as shown in Fig. 4 of the drawings is adapted to the actuation of devices requiring a substantial amount of power to move them in both directions axially of the rod 128.

It will be understood that further modifications of the invention may be limited only by a just interpretation of the following claims.

I claim:

1. In an actuator: a first pneumatic pressure responsive member formed for the transmission of motion to a device to be actuated; a feedback valve disposed for operation by said member; a second pneumatic pressure responsive member operably disposed relative to said feedback valve and co-operating with said first pressure responsive member to operate said feedback valve; pressure regulating means communicating with said second pneumatic pressure responsive means; pressure inlet means, said feedback valve communicating with said pressure inlet means and said first pressure responsive member; and a thermostatically operated bleed-off valve communicating with said first pressure responsive member for varying the pressure thereon independently of said feedback valve.

2. An actuator comprising: a casing having a first chamber formed therein; a first movable wall mounted in said first chamber and having a member disposed to be connected to a device to be moved; biasing means mounted in one side of said first chamber for urging said movable wall towards the other side of said first chamber; vent means in said one side of said first chamber; a valve for controlling the admission of fluid pressure to the other side of said first chamber; a second movable wall connected to said valve, said second movable wall being mounted in a second chamber formed in said casing; means for connecting a source of fluid pressure to both said valve and one side of said second chamber; pressure regulating means for controlling the fluid pressure in said one side of said second chamber; and additional means for resiliently connecting said first movable wall to said valve.

3. An actuator comprising: a casing having a first chamber formed therein; a movable wall mounted in said first chamber and having a member disposed to be connected to a device to be moved; biasing means mounted in one side of said first chamber for urging said movable wall towards the other side of said first chamber; vent means in said one side of said first chamber; a valve for controlling the admission of fluid pressure to the other side of said first chamber, said valve consisting of a piston disposed in a cylinder formed in said casing; an inlet opening in said cylinder; conduit means for connecting said inlet opening to a source of pressurized fluid; a vent opening in said cylinder; additional openings in said cylinder for connecting said other side of the first chamber to said cylinder so that said valve may either vent said other side or admit pressurized fluid thereto; a second movable wall connected to said valve, said second movable wall being mounted in a second chamber formed in said casing; means for connecting a source of fluid pressure to both said valve and one side of said second chamber; pressure regulating means for controlling the fluid pressure in said one side of said second chamber; and additional means for resiliently connecting said first movable wall to said valve.

4. An actuator comprising: a casing having a first chamber formed therein; a movable wall mounted in said first chamber and having a member disposed to be connected to a device to be moved; biasing means mounted in one side of said first chamber for urging said movable wall towards the other side of said first chamber; vent means in said one side of said first chamber; a valve for controlling the admission of fluid pressure to the other side of said first chamber; a second movable wall connected to said valve, said second movable wall being mounted in a second chamber formed in said casing; means for connecting a source of fluid pressure to both said valve and one side of said second chamber; pressure regulating means for controlling the fluid pressure in said one side of said second chamber; a thermostatically operated valve connected to said other side of the first chamber for venting fluid therefrom in response to the temperature adjacent said device; and additional means for resiliently connecting said first movable wall to said valve.

5. In an actuator: a first means formed for connection with a device to be actuated, said first means being responsive to fluid pressure; valve means disposed between a source of fluid pressure and said first means to control the application of fluid pressure to the latter; actuating means directly connected with said valve means to effect the operation thereof, said actuating means being responsive to fluid pressure to move said valve means in one direction; means forming a resilient connection between said first means and said valve means, fluid pressure applied to said first means tending to move said valve means in the direction opposite that effected by said actuating means; and regulator means for applying regulated pressure to said actuating means to move said valve means in said one direction.

6. In an actuator: a first means formed for connection with a device to be actuated, said first means being responsive to fluid pressure to move in one direction; resilient means tending to oppose movement of said first means in said one direction; valve means disposed between a source of fluid pressure and said first means to control the application of fluid pressure to the latter; actuating means directly connected with said valve means to effect the operation thereof, said actuating means being responsive to fluid pressure to move said valve means in a direction opposed to said one direction; resilient means tending to oppose movement of said actuating means by fluid pressure; means forming a resilient connection between said first means and said valve means, said connection tending to transmit movement of said first member in response to fluid pressure to said valve means; and regulator means for applying regulated pressure to said actuating means to move said valve means in said opposite direction.

7. In an actuator: a casing forming first and second axially aligned chambers having fluid pressure inlet ports, said casing forming a valve bore between said chambers, said valve bore establishing communication between said first chamber and its inlet and an outlet port; movable wall means disposed in each chamber, the wall means in said first chamber being formed for connection with a device to be actuated; valve means disposed for movement in said valve bore to control communication between said first chamber at one side of the movable wall means and said inlet and outlet ports, said valve means being directly connected for operation by the movable wall means in said second chamber and having a lost-motion connection with the movable wall means in said first chamber, fluid pressure applied to the wall means in said first and second chambers tending to move said wall means in opposite directions; and pressure regulating means for regulating the fluid pressure applied to the wall means in said second chamber.

8. In an actuator: a casing; first and second movable wall elements disposed in said casing and serving to divide the interior thereof into fluid pressure receiving working chamber and reduced pressure chamber sections, said first wall element being formed for connection with a device to be moved, fluid pressure supplied to said working chamber sections tending to move said wall elements in opposite directions; valve means disposed for movement in said casing to control fluid pressure supplied to the working chamber section at the side of said first wall element, said valve means being moved through direct engagement with said second wall element; means establishing a resilient connection between said first wall element and said valve means, movement of said first wall element in one direction in response to fluid pressure tending to move said valve means in a predetermined direction; passage means for connecting a source of fluid pressure to said casing; and regulator means communicating with the working pressure chamber section at the side of said second movable wall to control fluid pressure therein.

9. In an actuator: a casing; first and second movable wall elements disposed in said casing and serving to divide the interior thereof into fluid pressure receiving working chamber and reduced pressure chamber sections, said first wall element being formed for connection with a device to be moved, fluid pressure supplied to said working chamber sections tending to move said wall elements in opposite directions; resilient means in said casing tending to resist movement of said wall elements in response to fluid pressure in said working chamber sections; valve means disposed for movement in said casing to control fluid pressure supplied to the working chamber section at the side of said first wall element, said valve being moved through direct engagement with said second wall element; means establishing a resilient connection between said first wall element and said valve means, movement of said first wall element in one direction in response to fluid pressure tending to move said valve means in a predetermined direction; passage means for connecting a source of fluid pressure to said casing; and regulator means communicating with the working pressure chamber section at the side of said second movable wall element to control fluid pressure therein.

References Cited in the file of this patent

UNITED STATES PATENTS

| | | |
|---|---|---|
| 2,013,222 | Thomas | Sept. 3, 1935 |
| 2,220,180 | Spitzglass et al. | Nov. 5, 1940 |
| 2,303,752 | Meredith | Dec. 1, 1942 |
| 2,484,557 | Eckman | Oct. 11, 1949 |
| 2,575,085 | Alyea | Nov. 13, 1951 |

UNITED STATES PATENT OFFICE
CERTIFICATE OF CORRECTION

Patent No. 2,867,194 January 6, 1959

Raymond W. Jensen

It is hereby certified that error appears in the printed specification of the above numbered patent requiring correction and that the said Letters Patent should read as corrected below.

Column 1, line 69, before the word "view" insert -- sectional --; column 3, line 49, for "that", first occurrence, read -- than --; column 4, line 7, for "diaphragmn" read -- diaphragm --; line 62, strike out "the", second occurrence; column 8, line 3, for "diaphragm 16" read -- diaphragm 116 --.

Signed and sealed this 14th day of April 1959.

(SEAL)
Attest:

KARL H. AXLINE

Attesting Officer

ROBERT C. WATSON
Commissioner of Patents